United States Patent
Kitagawa et al.

(10) Patent No.: US 12,097,860 B2
(45) Date of Patent: Sep. 24, 2024

(54) TRAVELING LANE PLANNING DEVICE, MEDIUM STORING COMPUTER PROGRAM FOR TRAVELING LANE PLANNING, AND TRAVELING LANE PLANNING METHOD

(71) Applicant: TOYOTA JIDOSHA KABUSHIKI KAISHA, Toyota (JP)

(72) Inventors: Eiki Kitagawa, Tokyo-to (JP); Ryo Hashimoto, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 17/691,228

(22) Filed: Mar. 10, 2022

(65) Prior Publication Data

US 2022/0315002 A1 Oct. 6, 2022

(30) Foreign Application Priority Data

Mar. 30, 2021 (JP) ................. 2021-058616

(51) Int. Cl.
*B60W 30/18* (2012.01)
(52) U.S. Cl.
CPC ... *B60W 30/18163* (2013.01); *B60W 2520/10* (2013.01); *B60W 2520/105* (2013.01); *B60W 2552/10* (2020.02); *B60W 2554/802* (2020.02); *B60W 2554/804* (2020.02); *B60W 2555/60* (2020.02)
(58) Field of Classification Search
CPC .......... B60W 30/18163; B60W 10/20; B60W 2554/801; G08G 1/167; B62D 15/0255; B62D 15/0265
See application file for complete search history.

(56) References Cited

U.S. PATENT DOCUMENTS

| | | | |
|---|---|---|---|
| 2005/0256630 A1 | 11/2005 | Nishira et al. | |
| 2018/0201272 A1* | 7/2018 | Takeda | B60W 10/20 |
| 2019/0382021 A1* | 12/2019 | Niibo | B60W 10/184 |
| 2019/0382022 A1 | 12/2019 | Niibo et al. | |
| 2020/0307599 A1* | 10/2020 | Oka | B60W 60/00276 |

FOREIGN PATENT DOCUMENTS

| | | |
|---|---|---|
| JP | 2005-324727 A | 11/2005 |
| JP | 2019-217827 A | 12/2019 |
| JP | 2019-217828 A | 12/2019 |
| JP | 2020-157831 A | 10/2020 |
| WO | 2017/010349 A1 | 1/2017 |

* cited by examiner

*Primary Examiner* — Kenneth J Malkowski
(74) *Attorney, Agent, or Firm* — Oliff PLC (57) ABSTRACT

A traveling lane planning device comprises a processor configured to select multiple spaces on an adjacent lane which allow the vehicle to move from the traveling lane, to calculate an evaluation value for each space based on a distance from a current location of the vehicle to a movement completion location where movement to the adjacent lane is to be complete, as determined based on terrain restrictions, a length of the space, a positional relationship between the current location of the vehicle and the space, a size of acceleration or deceleration estimated to take place with the vehicle while it travels from the current location to the location along the space, and a first speed difference between a space speed and a target speed of the vehicle, and to set one space to be a destination from among multiple spaces based on the evaluation value.

11 Claims, 6 Drawing Sheets

TRAVELING LANE PLANNING DEVICE, MEDIUM STORING COMPUTER PROGRAM FOR TRAVELING LANE PLANNING, AND TRAVELING LANE PLANNING METHOD

FIELD

The present disclosure relates to a traveling lane planning device, to a medium storing a computer program for traveling lane planning, and to a traveling lane planning method.

BACKGROUND

An automatic control system mounted in a vehicle creates a navigation route for the vehicle based on the current location of the vehicle, the destination location of the vehicle, and a navigation map. The automatic control system estimates the current location of the vehicle using the map information and controls the vehicle to travel along the navigation route. The automatic control system also controls operation of the vehicle, including its movement between traffic lanes.

When the vehicle moves from the traveling lane in which it is traveling to an adjacent lane, the automatic control system determines whether or not it is able to move based on the locations and speeds of other vehicles traveling on the adjacent lane.

The automatic control system defines multiple spaces on the adjacent lane based on the locations of the other vehicles traveling on the adjacent lane. The automatic control system also evaluates each of the multiple spaces and sets a destination space based on the evaluation results (see International Patent Publication No. 2017/10349, for example).

SUMMARY

Lane changes by an automatic control system are preferably operations that are comfortable for the driver riding in the vehicle. For example, it is a more comfortable lane change for the driver if the vehicle moves into a wide space than if it moves into a narrow space. In addition, making a lane change at a location with ample space before a traveling lane disappears is a more comfortable lane change for the driver than making a lane change at a location just before a lane change disappears. Furthermore, a lower degree of acceleration or deceleration during the lane change is more comfortable for the driver than a higher degree.

When the destination of a lane change is being determined, it is desirable for the lane change to be planned with consideration to greater comfort for the driver.

It is an object of the present disclosure to provide a traveling lane planning device that evaluates the space on an adjacent lane in which the vehicle can move.

One embodiment of the invention provides a traveling lane planning device. The traveling lane planning device has a space selecting unit that selects multiple spaces on an adjacent lane that are within a predetermined distance from a current location of a vehicle and which allow the vehicle to move from the lane in which the vehicle is traveling, an evaluation value calculating unit that calculates an evaluation value for each space based on a distance from the current location of the vehicle to a movement completion location where movement to the adjacent lane is to be complete, as determined based on terrain restrictions of the traveling lane, a length of the space, a positional relationship between the current location of the vehicle and the space, a size of acceleration or deceleration estimated to take place with the vehicle while the vehicle travels from the current location to a location next to the space, and a first speed difference between a space speed and a target speed which is the target for traveling of the vehicle and a space setting unit that sets one space to be a destination of the vehicle from among the multiple spaces based on the evaluation value.

Preferably in the traveling lane planning device, the evaluation value calculating unit calculates an evaluation value for each space based on the difference between the distance from the current location of the vehicle to the movement completion location where movement to the adjacent lane is to be complete, as determined based on terrain restrictions of the traveling lane, and a parallel running point distance in which the vehicle travels in the traveling lane until the point where the vehicle runs parallel to the space on the adjacent lane, the length of the space, the positional relationship between the current location of the vehicle and the space, the size of acceleration or deceleration estimated to take place with the vehicle while the vehicle travels from the current location to the location next to the space, and the first speed difference between the space speed and the target speed which is the target for traveling of the vehicle.

In this traveling lane planning device, preferably the space setting unit sets the space that is to be the destination of the vehicle at each predetermined timing, and the evaluation value calculating unit also calculates an evaluation value for each space based on information representing whether or not the space set as the destination of the vehicle at the previous timing matches the space selected at the current timing.

In this traveling lane planning device, the evaluation value calculating unit also preferably calculates the evaluation value for each space based on the parallel running point time required for the vehicle to travel from the current location to the location next to the space.

Also preferably in the traveling lane planning device, the evaluation value calculating unit also calculates the evaluation value for each space based on a starting distance required to travel on the traveling lane to a start location where movement of the vehicle from the traveling lane to the adjacent lane is physically and legally possible.

In this traveling lane planning device, preferably the evaluation value calculating unit also calculates the evaluation value for each space based on a second speed difference which is the difference between the speed of the vehicle and the space speed.

In this traveling lane planning device, preferably the evaluation value calculating unit also calculates the evaluation value for each space based on a third speed difference which is the difference between the speed of the vehicle and a speed of another vehicle located ahead of or behind the space, on the adjacent lane.

In this traveling lane planning device, preferably the evaluation value calculating unit also calculates the evaluation value for each space based on an inter-vehicular distance between the location of another vehicle located ahead or behind the vehicle, and the current location of the vehicle, on the traveling lane.

In this traveling lane planning device, preferably the evaluation value calculating unit also calculates the evaluation value for each space based on a fourth speed difference which is the difference between the speed of the vehicle and the speed of another vehicle located ahead of or behind the vehicle, on the traveling lane.

According to another embodiment, a non-transitory storage medium storing a computer program for traveling lane planning is provided. The computer program for traveling lane planning causes a processor to execute a process and the process includes selecting multiple spaces on an adjacent lane that are within a predetermined distance from a current location of a vehicle and which allow the vehicle to move from the lane in which the vehicle is traveling, calculating an evaluation value for each space based on a distance from the current location of the vehicle to a movement completion location where movement to the adjacent lane is to be complete, as determined based on terrain restrictions of the traveling lane, a length of the space, a positional relationship between the current location of the vehicle and the space, a size of acceleration or deceleration estimated to take place with the vehicle while the vehicle travels from the current location to a location next to the space, and a first speed difference between a space speed and a target speed which is the target for traveling of the vehicle, and setting one space to be a destination of the vehicle from among the multiple spaces based on the evaluation value.

Another embodiment of the invention provides a traveling lane planning method. The traveling lane planning method is carried out by a traveling lane planning device and the method includes selecting multiple spaces on an adjacent lane that are within a predetermined distance from a current location of a vehicle and which allow the vehicle to move from the lane in which the vehicle is traveling, calculating an evaluation value for each space based on a distance from the current location of the vehicle to a movement completion location where movement to the adjacent lane is to be complete, as determined based on terrain restrictions of the traveling lane, a length of the space, a positional relationship between the current location of the vehicle and the space, a size of acceleration or deceleration estimated to take place with the vehicle while the vehicle travels from the current location to a location next to the space, and a first speed difference between a space speed and a target speed which is the target for traveling of the vehicle, and setting one space to be a destination of the vehicle from among the multiple spaces based on the evaluation value.

Since the traveling lane planning device of the invention allows evaluation of a space on the adjacent lane in which the vehicle can move, it is possible to plan lane changes while giving more consideration to comfort of the driver based on the space.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
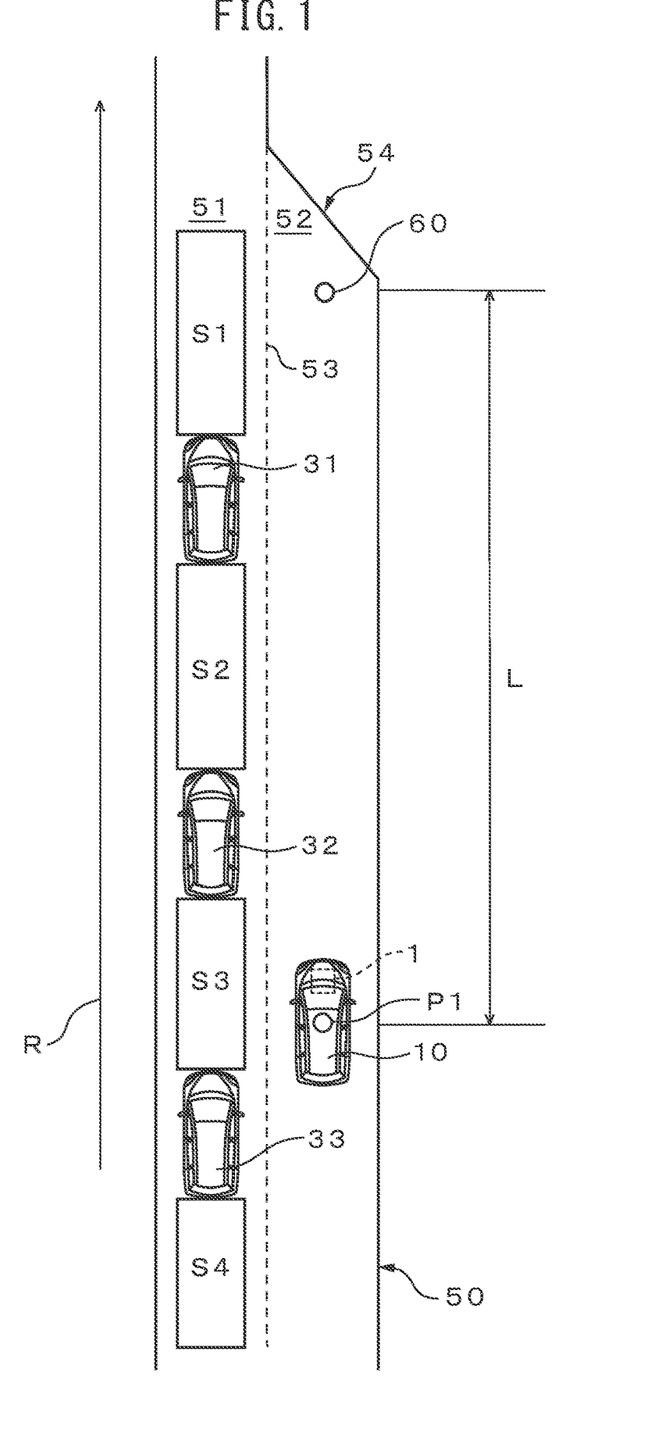
FIG. 1 is a diagram illustrating in overview the operation of a vehicle control system according to an embodiment.

FIG. 1 is a diagram illustrating in overview the operation of a vehicle control system 1 according to the embodiment. Operation relating to traveling lane plan processing by the vehicle control system 1 disclosed herein will now be described in overview with reference to FIG. 1.

FIG. 1 shows an example of a navigation route R generated by a vehicle control system 1 mounted in a vehicle 10. The automatically controlled vehicle 10 is traveling on a road 50 at a current location P1 and is expected to proceed straight on the road 50.

The vehicle 10 is traveling on one traffic lane 52 of a road 50 having traffic lanes 51, 52. The traffic lane 51 and traffic lane 52 are divided by a lane marking line 53. The traffic lane 52 disappears at a disappearing location 54 ahead by a distance L from the current location P1 of the vehicle 10. The traffic lane 52 is an example of a traveling lane, and the traffic lane 51 is an example of an adjacent lane. Disappearance of a traffic lane is an example of a lane terrain restriction.

Before the disappearing location 54, a movement completion location 60 is set where movement from the traffic lane 52 to the traffic lane 51 is complete, based on disappearance of the traffic lane 52.

The vehicle control system 1 plans movement from the traffic lane 52 to the traffic lane 51 until the vehicle 10 reaches the movement completion location 60.

The vehicle control system 1 selects multiple spaces S1 to S4 on the traffic lane 51 that are within a predetermined distance from the current location P1 of the vehicle 10 and wherein movement is possible from the traffic lane 52 in which the vehicle 10 is traveling. The multiple spaces S1 to S4 are set based on locations of vehicles 31, 32, 33 located on the traffic lane 51.

The vehicle control system 1 calculates evaluation values for each of the multiple spaces S1 to S4. The evaluation value are calculated based on at least the following five variables.

(1) The distance L from the current location P1 of the vehicle 10 to the movement completion location 60 where movement to the traffic lane 51 is to be completed, set based on terrain restrictions of the traffic lane 52.
(2) The lengths of the spaces S1 to S4
(3) The positional relationship between the current location P1 of the vehicle 10 and the spaces S1 to S4.
(4) The size of acceleration or deceleration estimated to take place with the vehicle 10 when the vehicle 10 travels from the current location P1 to the locations next to spaces S1 to S4.
(5) The difference in speed between the speed of the spaces S1 to S4 and the target speed which is the target for traveling of the vehicle 10.

The vehicle control system 1 calculates the evaluation values for each of the multiple spaces S1 to S4 using an evaluation function that determines the sum of products of each variable and the weight for each variable.

When two spaces have the similar length, the evaluation function calculates the evaluation value in such a manner that the evaluation value for the space is higher with a greater difference between the distance L and the moving distance of the vehicle 10 until it runs parallel to the space. This facilitates selection of spaces further prior to the disappearing location 54.

The evaluation function calculates the evaluation value so that, for two spaces of similar length, the evaluation value for the spaces increases with lower acceleration or deceleration estimated to take place with the vehicle 10. It thus becomes easier to select a space with low acceleration or deceleration during movement.

When two spaces have similar lengths, the evaluation function calculates the evaluation value in such a manner that the evaluation value for the space is higher with a smaller difference in speed between the speed of the spaces S1 to S4 and the target speed which is the target for traveling of the vehicle 10. It thus becomes easier to select a space with low change in speed during movement.

Based on the evaluation value, the vehicle control system 1 sets one space as the destination of the vehicle 10 from among the multiple spaces S1 to S4.

Since the vehicle control system 1 thus allows evaluation of a space on the adjacent lane in which the vehicle can move, it is possible to plan lane changes while giving more consideration to comfort of the driver based on the space.

Figure 2:
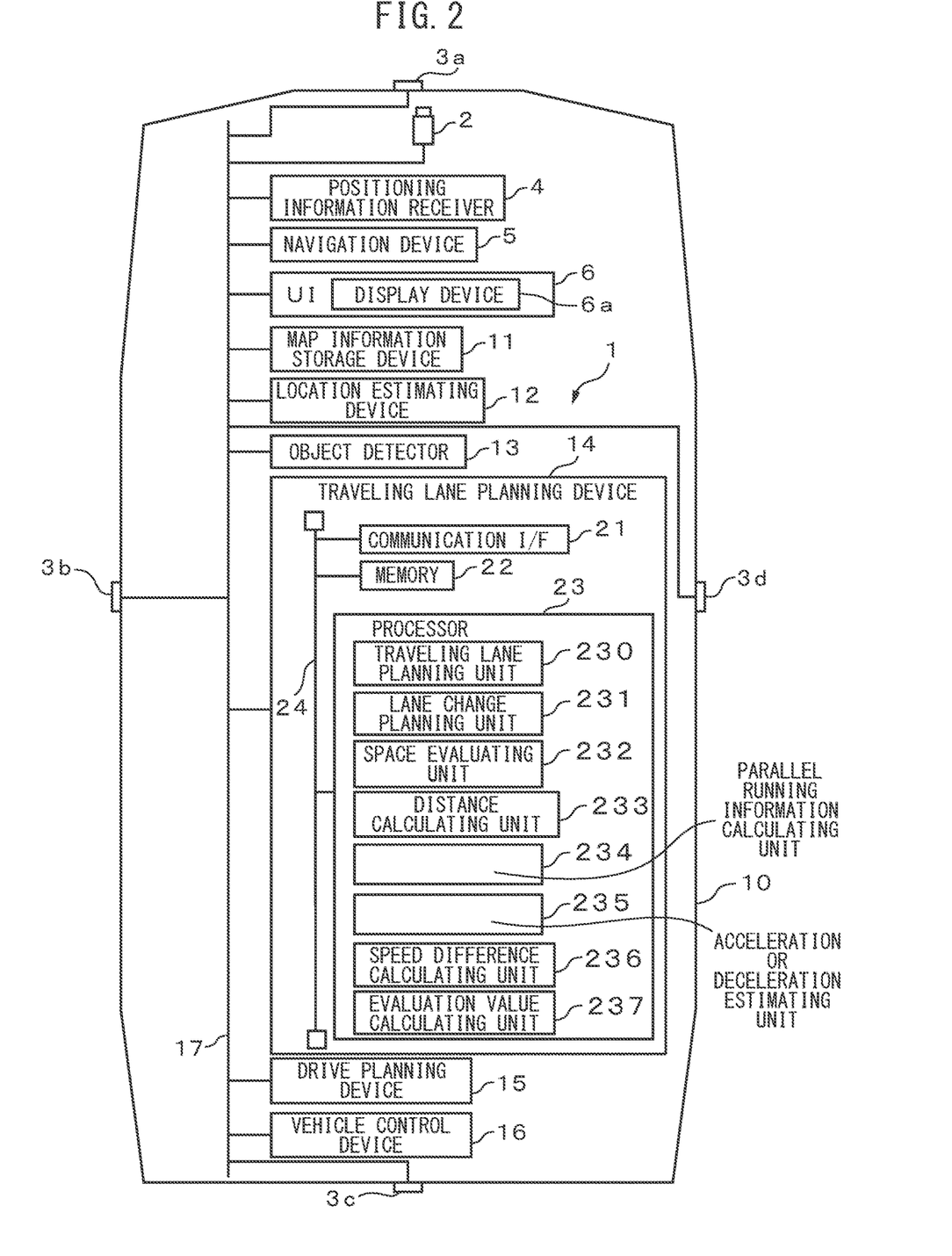
FIG. 2 is a general schematic drawing of a vehicle in which a vehicle control system of the embodiment is mounted.

FIG. 2 is a general schematic drawing of a vehicle 10 in which the vehicle control system 1 is mounted. The vehicle 10 has a camera 2, LiDAR sensors 3a to 3d, a positioning information receiver 4, a navigation device 5, a user interface (UI) 6, a map information storage device 11, a location estimating device 12, an object detector 13, a traveling lane planning device 14, a drive planning device 15 and a vehicle control device 16. The vehicle 10 may also have a radar sensor, as another distance sensor (not shown) for measurement of the distance of the vehicle 10 to surrounding objects.

The camera 2, LiDAR sensors 3a to 3d, positioning information receiver 4, navigation device 5, UI 6, map information storage device 11, location estimating device 12, object detector 13, traveling lane planning device 14, drive planning device 15 and vehicle control device 16 are connected in a communicable manner through an in-vehicle network 17 that conforms to controller area network standards.

The camera 2 is an example of an imaging unit provided in the vehicle 10. The camera 2 is mounted inside the vehicle 10 and directed toward the front of the vehicle 10. The camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that forms an image of the photographed region on the 2D detector. The vehicle 10 may also have cameras that photograph the environment in predetermined regions at the rear, left and right of the vehicle 10.

Each time a camera image is taken, the camera 2 outputs the camera image and the camera image photograph time at which the camera image was taken, through the in-vehicle network 17 to the location estimating device 12 and object detector 13 etc. The camera image is also used for processing at the location estimating device 12 to estimate the location of the vehicle 10. At the object detector 13, the camera image is used for processing to detect other objects surrounding the vehicle 10.

The LiDAR sensors 3a to 3d are mounted on the outer sides of the vehicle 10, for example, being directed toward the front, the left, the rear and the right of the vehicle 10, respectively. The LiDAR sensors 3a to 3d respectively synchronize and emit a pulsed laser ahead, to the left, behind and to the right of the vehicle 10, at a reflected wave information acquisition time set with a predetermined cycle, and receive a reflected wave that has been reflected from a reflector. The time required for the reflected wave to return contains information for the distance between the vehicle 10 and outside features located in the direction in which the laser has been emitted. Each of the LiDAR sensors 3a to 3d outputs the reflected wave information that includes the laser emission direction and the time required for the reflected wave to return, together with the reflected wave information acquisition time at which the laser was emitted, through the in-vehicle network 17 to the object detector 13. At the object detector 13, the reflected wave information is used for processing to detect other objects surrounding the vehicle 10.

The positioning information receiver 4 outputs positioning information that represents the current location of the vehicle 10. The positioning information receiver 4 may be a GNSS receiver, for example. The positioning information receiver 4 outputs positioning information and the positioning information acquisition time at which the positioning information has been acquired, to the navigation device 5 and map information storage device 11 etc., each time positioning information is acquired at a predetermined receiving cycle.

Based on the navigation map information, the destination location of the vehicle 10 input through the UI 6, and positioning information representing the current location of the vehicle 10 input from the positioning information receiver 4, the navigation device 5 creates a navigation route R from the current location to the destination location of the vehicle 10. The navigation route R includes information relating to the locations of right turns, left turns, merging and branching. When the destination location has been newly set or the current location of the vehicle 10 has exited the navigation route R, the navigation device 5 creates a new navigation route R for the vehicle 10. Every time a navigation route R is created, the navigation device 5 outputs the navigation route R to the location estimating device 12 and the traveling lane planning device 14 etc., via the in-vehicle network 17.

The UI 6 is an example of the notifying unit. The UI 6, controlled by the navigation device 5 and vehicle control device 16, notifies the driver of the vehicle 10 traveling information. The UI 6 also creates an operation signal in response to operation of the vehicle 10 by the driver. The traveling information of the vehicle 10 includes information relating to the current location of the vehicle and the current and future route of the vehicle, such as the navigation route. The UI 6 has a display device 6a such as a liquid crystal display or touch panel, for display of the traveling information. The UI 6 may also have an acoustic output device (not shown) to notify the driver of traveling information. The UI 6 also has a touch panel or operating button, for example, as an input device for inputting operation information from the driver to the vehicle 10. The operation information may be, for example, a destination location, transit points, vehicle speed or other control information for the vehicle 10. The UI 6 outputs the input operation information to the navigation device 5 and the vehicle control device 16 etc., via the in-vehicle network 17.

The map information storage device 11 stores wide-area map information for a relatively wide area (an area of 10 to 30 km$^2$, for example) that includes the current location of the vehicle 10. The map information preferably has high precision map information including three-dimensional information for the road surface, information for the types and locations of structures and road features such as road lane marking lines, and the legal speed limit for the road. The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 4, the map information storage device 11 refers to the stored wide-area map information and outputs map information for a relatively narrow area including the current location represented by the positioning information (for example, an area of 100 m to 10 km$^2$), through the in-vehicle network 17 to the location estimating device 12, object detector 13, traveling lane planning device 14, drive planning device 15 and vehicle control device 16 etc.

The location estimating device 12 estimates the location of the vehicle 10 at the camera image photograph time, based on the road features surrounding the vehicle 10 represented in the camera image. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15 and vehicle control device 16 etc.

The object detector 13 detects other objects around the vehicle 10, and their types, based on the camera image. Other objects also include other vehicles traveling around the vehicle 10. The object detector 13 detects objects represented in the camera image, by inputting the image into a discriminator, for example. The discriminator may use a deep neural network (DNN) that has been trained to detect objects represented in input images, for example. The object detector 13 used may also be a discriminator other than a DNN. For example, the discriminator used by the object detector 13 may be a support vector machine (SVM) that has been trained to output a confidence factor for representation of objects to be detected in the window, with the input being a feature descriptor (such as Histogram of Oriented Gradients, HOG, for example) calculated from a window set in the camera image. Alternatively, the object detector 13 may detect an object region by template matching between the image and a template in which an object to be detected is represented.

The object detector 13 may also detect other objects around the vehicle 10 based on reflected wave information output by the LiDAR sensors 3a to 3d. The object detector 13 may also determine the orientation of another object with respect to the vehicle 10 based on the location of the other object in the camera image, and may determine the distance between the other object and the vehicle 10, based on the orientation and on the reflected wave information output by the LiDAR sensors 3a to 3d. The object detector 13 estimates the location of the other object represented in a world coordinate system based on the current location of the vehicle 10, and the distance of the other object from the vehicle 10 and its orientation, for example. The object detector 13 may also track another object to be detected from an updated image, by matching other objects detected in the updated camera image with objects detected in previous images, according to a tracking process based on optical flow. The object detector 13 may also calculate the trajectory of another object being tracked, based on the location of the object in an image updated from a previous image, represented in the world coordinate system. The object detector 13 can estimate the speed of another object with respect to the vehicle 10, based on changes in the location of the object over the course of time. The object detector 13 can also estimate the acceleration of another object based on changes in the speed of the object over the course of time. In addition, the object detector 13 identifies the traveling lanes in which the other objects are traveling, based on the lane marking lines represented in the map information and the locations of the objects. The object detector 13 also determines, for example, whether another object is traveling in a traffic lane defined by two mutually adjacent lane marking lines situated on either side of the center location of the other object in the lateral direction. The object detector 13 outputs object detection information which includes information representing the types of other objects that were detected, information indicating their locations, and also information indicating their speeds, accelerations and traveling lanes, to the traveling lane planning device 14 and drive planning device 15 etc.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the drive planning device 15 of the traveling lane plan.

The traveling lane planning device 14 also determines whether or not a lane change is necessary within the nearest driving zone selected from the navigation route R, based on the traveling lane plan, the map information, the navigation route R and the current location of the vehicle 10, and generates a lane change plan in accordance with the assessment results. The lane change plan includes a lane change schedule zone in the lane in which the vehicle 10 is traveling, where it is scheduled to move to an adjacent lane. Specifically, the traveling lane planning device 14 determines whether or not a lane change is necessary for moving to a traffic lane toward the destination location of the vehicle 10, based on the navigation route R and the current location of the vehicle 10. It is determined whether or not the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out. The traveling lane planning device 14 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. The traveling lane planning device 14 also generates a lane change plan in response to a driver request.

The traveling lane planning device 14 selects multiple spaces on an adjacent lane, that are within a predetermined distance from the current location of the vehicle 10 and wherein movement is possible from the traveling lane on which the vehicle 10 is traveling. The traveling lane planning device 14 also calculates an evaluation value for each space, based on the distance from the current location of the vehicle 10 to a movement completion location where movement to the adjacent lane is to be complete, as determined based on terrain restrictions of the traveling lane, the length of the space, the positional relationship between the current location of the vehicle 10 and the space, the size of acceleration or deceleration estimated to take place with the vehicle 10 while the vehicle 10 travels from the current location to a location next to the space, and the difference in speed between the space speed and the target speed which is the target for traveling of the vehicle 10. The traveling lane planning device 14 sets one space to be the destination of the vehicle from among multiple spaces based on the evaluation value. The traveling lane planning device 14 comprises a communication interface (IF) 21, a memory 22 and a processor 23 for this purpose. The communication interface 21, memory 22 and processor 23 are connected via signal wires 24. The communication interface 21 has an interface circuit to connect the traveling lane planning device 14 with the in-vehicle network 17. The traveling lane planning device 14 is an example of a lane change evaluating device.

All or some of the functions of the traveling lane planning device 14 are functional modules driven by a computer program operating on the processor 23, for example. The processor 23 comprises a traveling lane planning unit 230, a lane change planning unit 231, a space evaluating unit 232, a distance calculating unit 233, a parallel running information calculating unit 234, an acceleration or deceleration estimating unit 235, a speed difference calculating unit 236, and an evaluation value calculating unit 237. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. The memory 22 is an example of a memory unit, and it has a volatile semiconductor memory and a non-volatile semiconductor memory, for example. The memory 22 stores an application computer program and various data to be used for information processing carried out by the processor 23 of each device. The traveling lane planning unit 230 generates the aforementioned traveling lane plan while the lane change planning unit 231 generates the aforementioned lane change plan. Other details regarding operation of the traveling lane planning device 14 are described below.

At a driving plan creation time set with a predetermined cycle, the drive planning device 15 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The drive planning device 15 generates a driving plan to maintain a spacing of at least a predetermined distance between the vehicle 10 and other vehicles. When the traveling lane plan includes a lane change wherein the vehicle 10 is to move between lanes, but a spacing of at least a predetermined distance cannot be ensured between the vehicle 10 and another vehicle, the drive planning device 15 generates a driving plan for stopping the vehicle 10. The drive planning device 15 outputs the driving plan to the vehicle control device 16 for each driving plan generated.

When the vehicle 10 is operated by automatic control, the vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 17. The vehicle control device 16 also determines the amount of fuel injection according to a set accelerator level, and outputs a control signal corresponding to the amount of fuel injection to a drive unit (not shown) of the engine of the vehicle 10, via the in-vehicle network 17. Alternatively, the vehicle control device 16 may output a control signal corresponding to a set brake level to the brake (not shown) of the vehicle 10, via the in-vehicle network 17. When the vehicle 10 is operated by manual control, the vehicle control device 16 controls the steering wheel, drive unit or brake according to the amount of driver-operated steering, accelerator or brake level.

Figure 3:
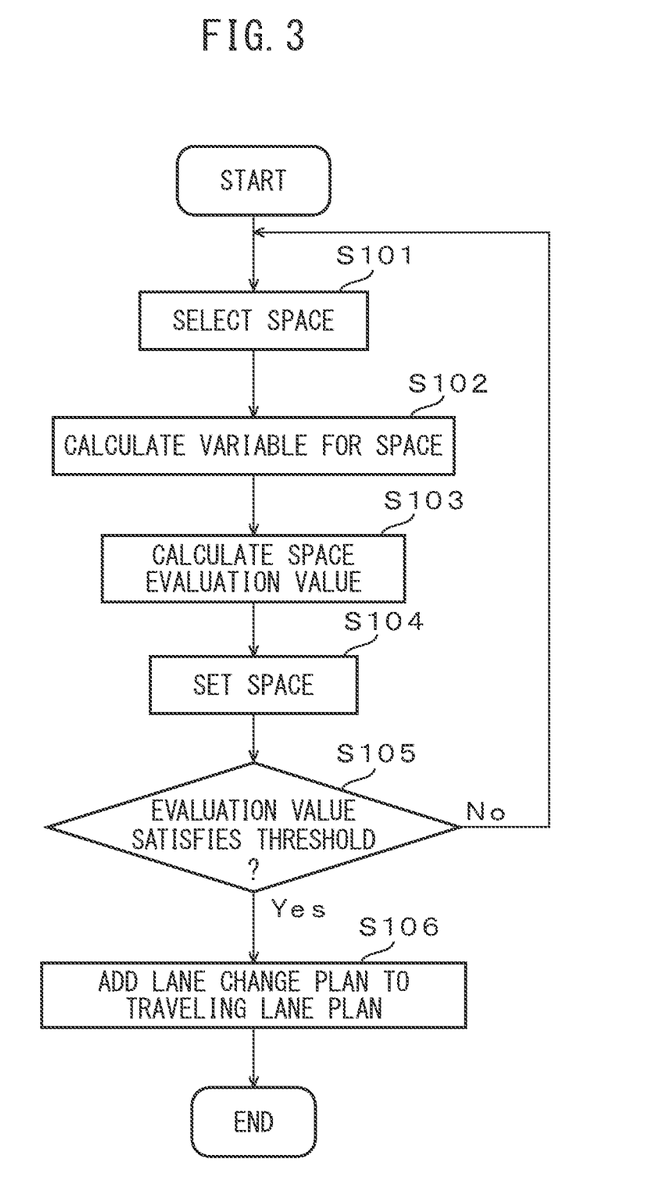
FIG. 3 is an example of an operation flow chart for traveling lane plan processing by a vehicle control system of the embodiment.

For FIG. 3, the map information storage device 11, location estimating device 12, object detector 13, traveling lane planning device 14, drive planning device 15 and vehicle control device 16 were explained as separate devices, but all or some of them may be constructed in a single device.

FIG. 3 is an example of an operation flow chart for traveling lane plan processing by a vehicle control system 1 of the embodiment. Traveling lane plan processing by the vehicle control system 1 will be described below with reference to FIG. 3. The traveling lane planning device 14 carries out traveling lane plan processing according to the operation flow chart shown in FIG. 3, each time a lane change plan is generated.

For space selection processing, the space evaluating unit 232 first selects multiple spaces on an adjacent lane, that are within a predetermined distance from the current location of the vehicle 10 and wherein movement is possible from the traveling lane on which the vehicle 10 is traveling (step S101). The space evaluating unit 232 is an example of a space selecting unit.

The space evaluating unit 232, distance calculating unit 233, parallel running information calculating unit 234, acceleration or deceleration estimating unit 235 and speed difference calculating unit 236 then calculate variables for each of the multiple spaces (step S102).

The evaluation value calculating unit 237 then calculates an evaluation value for each space using the variable for each space (step S103).

Based on the evaluation value, the space evaluating unit 232 sets one space as the destination of the vehicle 10 from among the multiple spaces (step S104). The space evaluating unit 232 is an example of a space setting unit.

The space evaluating unit 232 then determines whether or not the evaluation value for the set space falls within the threshold (step S105). If the evaluation value for the space does not fall within the threshold (step S105—No), processing moves to step S101. In this case, the space evaluating unit 232 sets a space as the destination of the vehicle 10 for each predetermined timing. When the vehicle 10 has exited from the lane change schedule zone in the lane change plan, the series of processing steps is complete. In this case, the traveling lane planning device 14 generates a lane change plan in which the lane change has been canceled. The vehicle 10 continues to travel in the current traffic lane.

When the evaluation value of the space falls within the threshold on the other hand (step S105—Yes), the space evaluating unit 232 adds to the traveling lane plan a lane change plan including information representing the space that is to be the destination of the vehicle 10, and the series of processing steps is complete (step S106).

Based on the traveling lane plan, the drive planning device 15 generates a driving plan that includes movement to the space, and notifies the vehicle control device 16. The vehicle control device 16 controls movement of the vehicle 10 between lanes based on the driving plan.

The traveling lane planning device 14 preferably carries out the processing shown in FIG. 3 until the point where the vehicle 10 begins steering laterally toward an adjacent lane as it runs parallel to the destination space. For example, when a space having an evaluation value within the threshold no longer exists before the vehicle 10 begins steering laterally toward the adjacent lane as it runs parallel to the destination space, the traveling lane planning device 14 generates a lane change plan in which the lane change has been canceled. The vehicle 10 continues to travel in the current traffic lane.

Figure 4:
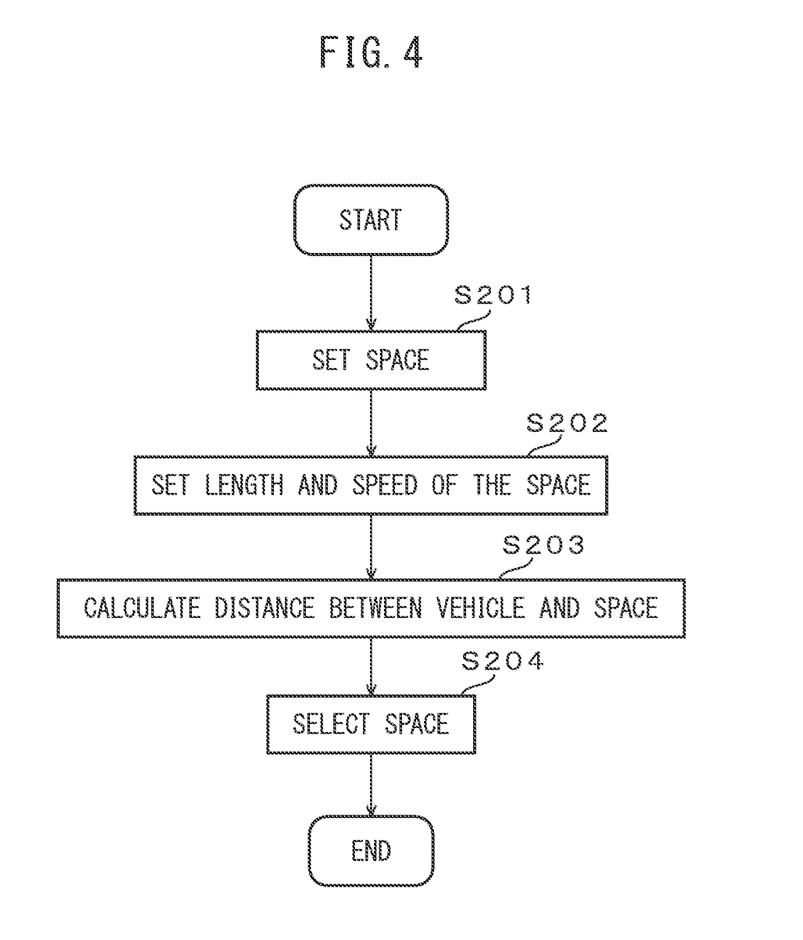
FIG. 4 is an example of an operation flow chart for illustration of space selection processing.

FIG. 4 is an example of an operation flow chart for illustration of space selection processing. First, the space evaluating unit 232 defines a space on the adjacent lane based on the location of another vehicle traveling on the adjacent lane (step S201).

The space evaluating unit 232 then defines the length and speed of the space based on the location and speed of the other vehicle traveling on the adjacent lane (step S202).

Next, the space evaluating unit 232 calculates the distance between the current location of the vehicle 10 and the location of the space (step S203).

The space evaluating unit 232 then selects one or multiple spaces on an adjacent lane, that are within a predetermined distance from the current location of the vehicle 10 and wherein movement is possible from the traveling lane on which the vehicle 10 is traveling, thus completing the series of processing steps (step S204).

Space selection processing in the operation flow chart of FIG. 4 will now be explained based on the example of FIG. 1.

First, the space evaluating unit 232 acquires the locations, speeds and traveling lanes of other vehicles located surrounding the current location P1 of the vehicle 10, based on object detection information input from the object detector 13.

In the example shown in FIG. 1, the space evaluating unit 232 determines that vehicles 31, 32, 33 are located on the traffic lane 51 next to the current location P1 of the vehicle 10.

The space evaluating unit 232 defines a space S2 between the vehicle 31 and the vehicle 32. The space evaluating unit 232 defines the length of the space S2 based on the distance between the vehicle 31 and vehicle 32. For example, the space evaluating unit 232 may define the length of the space S2 to be the mean distance between the vehicle 31 and vehicle 32. The space evaluating unit 232 defines the speed of the space S2 based on the speeds of the vehicle 31 and vehicle 32. For example, the space evaluating unit 232 may define the speed of the space S2 to be the average speed for the vehicle 31 and vehicle 32.

Similarly, the space evaluating unit 232 defines a space S3 between the vehicle 32 and the vehicle 33. The space evaluating unit 232 defines the length of the space S3 based on the distance between the vehicle 32 and vehicle 33. For example, the space evaluating unit 232 may define the length of the space S3 to be the mean distance between the vehicle 32 and vehicle 33. The space evaluating unit 232 defines the speed of the space S3 based on the speeds of the vehicle 32 and vehicle 33. For example, the space evaluating unit 232 may define the speed of the space S3 to be the average speed for the vehicle 32 and vehicle 33.

When no other vehicle is located within a predetermined distance ahead of the vehicle 31, the space evaluating unit 232 defines a space S1 ahead of the vehicle 31. The length of the space S1 may be 15 m, for example. The space evaluating unit 232 sets the speed of the space S1 based on the speed of the vehicle 31. For example, the space evaluating unit 232 may set the speed of the space S1 to be the average speed of the vehicle 31.

When no other vehicle is located within a predetermined distance behind the vehicle 33, the space evaluating unit 232 defines a space S4 behind the vehicle 33. The length of the space S4 may be 15 m, for example. The space evaluating unit 232 sets the speed of the space S4 based on the speed of the vehicle 33. For example, the space evaluating unit 232 may set the speed of the space S4 to be the average speed of the vehicle 33.

The space evaluating unit 232 calculates the distance between the current location P1 of the vehicle 10 and the locations of each of the spaces S1 to S4, along the traffic lane 52. The locations of each of the spaces S1 to S4 may be locations at the centers of each of the spaces in the direction along the traffic lane 52.

The space evaluating unit 232 selects a space within a predetermined distance from the current location P1 of the vehicle 10. The predetermined distance may be an area of 250 m before and after the current location P1 of the vehicle 10, for example. The space evaluating unit 232 also selects a space of a predetermined length to be the space on the adjacent lane 51 which allows safe movement from the traveling lane 52 on which the vehicle 10 is traveling. The predetermined length may be 10 m, for example. In the example shown in FIG. 1, the space evaluating unit 232 selects four spaces S1 to S4.

The space evaluating unit 232 may also identify the selected spaces using space identification information for identification of spaces. The space evaluating unit 232 may also track a space by relating vehicle identification information for identification of other vehicles located ahead of or behind the space, with the space identification information.

The length of each space is a variable A2 for calculating the space evaluation value. For each space, the distance between the space and the current location of the vehicle 10 is also a variable A3 for calculating the evaluation value of the space.

The other variables for calculating the evaluation value of the space are explained below. The distance calculating unit 233 refers to the map information and determines whether or not a terrain with a terrain restriction is present in the traveling lane within a predetermined distance. This predetermined distance is preferably longer than the distance at the time the space evaluating unit 232 selects the space. The predetermined distance may be 500 m, for example. A terrain restriction may be where the traffic lane disappears, or where traffic is blocked due to construction or a road accident. When terrain with a terrain restriction exists, the distance calculating unit 233 defines a movement completion location where movement to the adjacent lane is to be completed, before the terrain with the terrain restriction. For example, the movement completion location may be set to be 20 m before the terrain with the terrain restriction. The movement completion location may also be registered in the map information.

The distance calculating unit 233 refers to the map information and calculates the distance from the current location of the vehicle 10 to the movement completion location, along the traveling lane. In the example shown in FIG. 1, the distance calculating unit 233 calculates the distance L from the current location P1 of the vehicle 10 to the movement completion location 60, along the traffic lane 52.

The parallel running information calculating unit 234 calculates a parallel running point distance in which the vehicle 10 will travel on the traveling lane until the point where it runs parallel to the space selected on the adjacent lane, based on the current location and speed of the vehicle 10, and the location and speed of the selected space.

Figure 5:
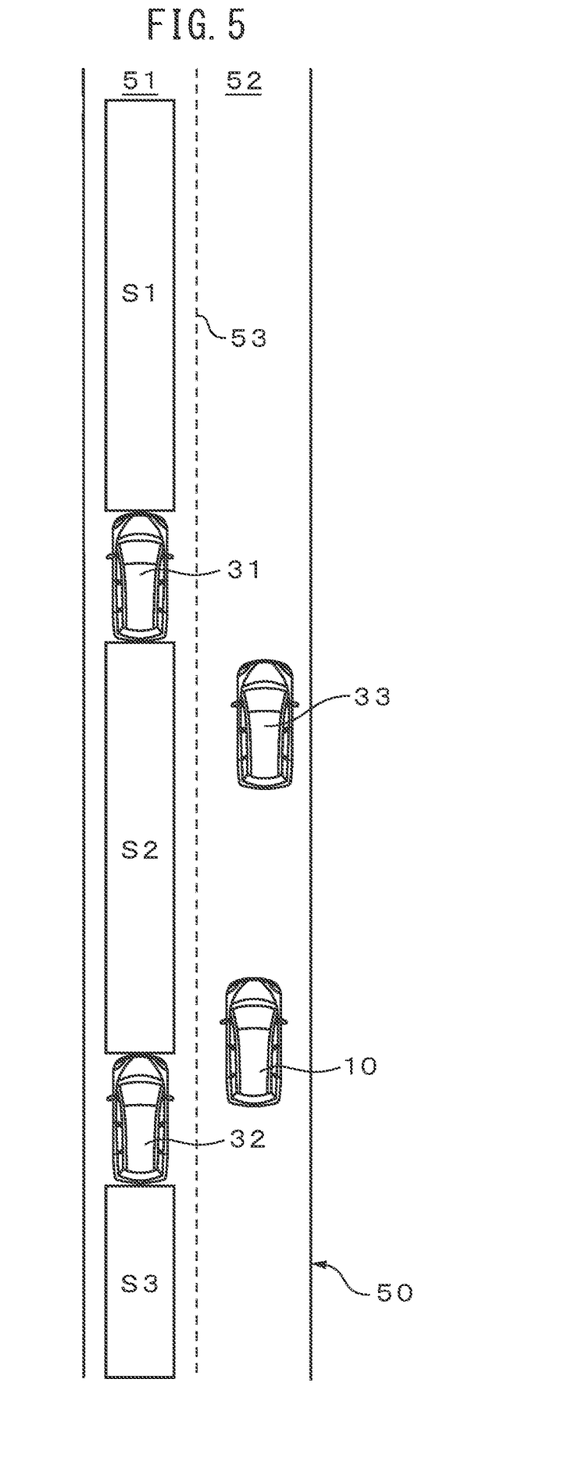
FIG. 5 is a diagram illustrating calculation of a parallel running point distance.

FIG. 5 is a diagram illustrating calculation of a parallel running point distance. The vehicle 10 has a lane change plan for moving from the traffic lane 52 to the traffic lane 51. Vehicles 31, 32 are traveling on the traffic lane 51. Spaces S1, S2, S3 are set on the traffic lane 51. A vehicle 33 is traveling on the traffic lane 52 ahead of the vehicle 10.

Figure 6:
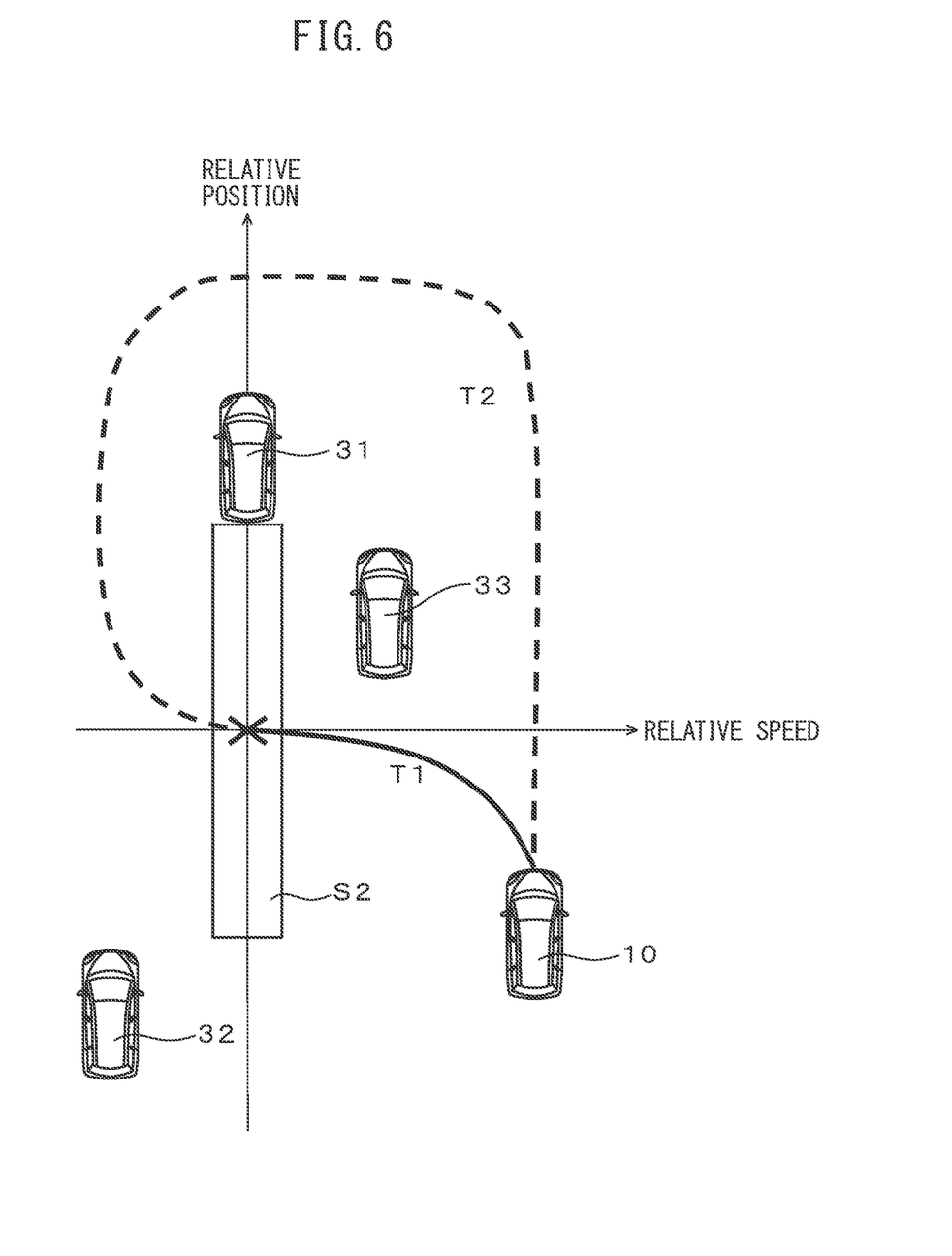
FIG. 6 is a diagram illustrating an example of a positional relationship between a vehicle and a space.

FIG. 6 is a diagram illustrating an example of a positional relationship between a vehicle 10 and a space. FIG. 6 uses coordinates with relative speed on the horizontal axis and relative position on the vertical axis, to represent the relationship between the vehicle 10, vehicles 31, 32, 33 and space S2 shown in FIG. 5. The space S2 is located at the origin in FIG. 6. The vertical axis represents the relative positions of the vehicle 10 and vehicles 31, 32, 33 with respect to the space S2, and the horizontal axis represents the relative speeds of the vehicle 10 and vehicles 31, 32, 33 with respect to the space S2.

The speed of the vehicle 33 located ahead of the vehicle 10 is slower than that of the vehicle 10. The vehicle 31 is at the same speed as the space S2. The speed of the vehicle 32 is slower than that of the vehicle 10.

T1 and T2 are possible trajectories on which the vehicle 10 may move to the space S2. The trajectory T1 represents movement of the vehicle 10 to the space S2 while reducing the speed below that of the vehicle 33 that is ahead. The trajectory T2 represents reduction in the speed of the vehicle 10 and movement to the space S2 after having moved ahead of the vehicle 31.

Traveling of the vehicle 10 on trajectory T2, however, involves contact of the vehicle 10 with the vehicle 33 that is ahead, and therefore this trajectory is not used.

The parallel running information calculating unit 234 selects trajectory T1 in which the vehicle 10 does not contact with other vehicles, and calculates the parallel running point distance.

For each space, the parallel running information calculating unit 234 determines the difference between the parallel running point distance and the distance from the current location of the vehicle 10 to the movement completion location. This difference is a variable A1 for calculating the space evaluation value for each space.

The acceleration or deceleration estimating unit 235 estimates the size of acceleration or deceleration estimated to take place with the vehicle 10 until the vehicle 10 moves on the traveling lane from the current location to a location next to the space selected on the adjacent lane.

As shown in FIG. 6, the acceleration or deceleration estimating unit 235 integrates the absolute value of the acceleration and/or deceleration while the vehicle 10 is traveling to determine the size of acceleration and/or deceleration along the trajectory T1 so that the vehicle 10 does not contact with the other vehicles.

For each space, the size of the acceleration and/or deceleration estimated to take place with the vehicle 10 while the vehicle 10 travels from the current location to a location next to the space is a variable A4 for calculating the space evaluation value.

The speed difference calculating unit 236 calculates the difference in speed between the space speed and the target speed as the target for traveling of the vehicle 10. The target speed may be, for example, the legal speed limit or a speed set by the driver.

For each space, the difference in speed between the space speed and the target speed as the target for traveling of the vehicle 10 is a variable A5 for calculating the space evaluation value.

The evaluation value calculating unit 237 calculates the space evaluation value Fj using the evaluation function represented by the following formula (1). The evaluation function calculates the sum of products of each variable and the weight for each variable as the evaluation value Fj for the space. The letter "j" here is the identifying character for the space.

$$Fj = \Sum_{i=1}^{N} wi Ai \qquad (1)$$

The letter "i" is the identifying character for the variable. The term "wi" is the weight of the variable Ai. A1 to A5 represent the following variables. N is the variable number, which is 5 in this case.

A1: Difference between distance from the current location of the vehicle 10 to the movement completion location, and parallel running point distance where the vehicle 10 travels on the traveling lane until the point where it runs parallel to the space on the adjacent lane A2: Length of space A3: Distance between space and current location of vehicle 10

A4: Size of acceleration or deceleration estimated to take place with vehicle when traveling from current location to the location next to space A5: Difference in speed between the speed of the space and the target speed which is the target for traveling of the vehicle 10.

Each weighting is determined by optimizing the weight of each variable so as to minimize the difference from the evaluation value obtained by the evaluation function. The weighting may be positive or negative, depending on the manner of the variable. The weighting for the evaluation functions shown in formula (1) can be set using the least-square method, for example.

If larger values are used for the evaluation value obtained by the evaluation function for more desirable spaces when optimizing the evaluation values, then the evaluation function will produce higher evaluation values for more desirable spaces. When the evaluation value is equal to or above a threshold value in step S105 above, the space evaluation value satisfies the threshold. If smaller values are used for the evaluation value obtained by the evaluation function for more desirable spaces, on the other hand, then the evaluation function will produce lower evaluation values for more desirable spaces. In this case, the space evaluation value satisfies the threshold when the evaluation value is equal to or below the threshold value in step S105 above.

In formula (1), the evaluation function is represented as the sum of products of each variable and the weight for each variable. The evaluation function may also be represented so as to include the sum of products of each variable and the weight for each variable, together with the product of the reciprocal of the variable and the weight for the reciprocal (wi/Ai).

The evaluation value calculating unit 237 may also use a discriminator that has learned the relationship between each variable and space evaluation values, to determine the space evaluation value.

The evaluation function described above produces a higher (or lower) evaluation value for spaces with a larger variable A1. Since it is thus easier to determine the destination the further the space is located ahead of the movement completion location, the driver feels more comfortable during lane change.

The evaluation function produces a higher (or lower) evaluation value for spaces with a larger variable A2. Since it is thus easier to determine the destination the longer the length of the space, the driver feels more comfortable during the lane change.

The evaluation function produces a higher (or lower) evaluation value for spaces with a smaller variable A3. Since it is thus easier to determine the destination the shorter the moving distance of the space, the driver feels more comfortable during the lane change.

The evaluation function produces a higher (or lower) evaluation value for spaces with a smaller variable A4. Since it is thus easier to determine the destination the smaller the acceleration or deceleration taking place during movement for the space, the driver feels more comfortable during the lane change.

The evaluation function produces a higher (or lower) evaluation value for spaces with a smaller variable A5. Since it is thus easier to determine the destination the smaller the difference in speed occurring during movement for the space, the driver feels more comfortable during the lane change.

As explained above, since the lane change evaluating device of this embodiment allows evaluation of a space on the adjacent lane in which the vehicle can move, it is possible to plan lane changes while giving more consideration to comfort of the driver based on the space.

In the embodiment described above, the evaluation value calculating unit 237 calculated the space evaluation value based on five variables. However, the evaluation value calculating unit 237 may also calculate the space evaluation value based on additional other variables. Other variables that can be used to calculate the space evaluation value by the evaluation value calculating unit 237 will now be described.

(1) Information representing whether or not the space set as the destination for the vehicle 10 at the previous timing matches the space selected at the current timing is a variable A6.

As explained for step S105 in FIG. 3, when the space evaluation value does not satisfy the threshold (step S105—No), the space evaluating unit 232 sets the space that is to be the destination of the vehicle 10 at each predetermined timing, until the space evaluation value satisfies the threshold.

The space evaluating unit 232 sets space information indicating whether or not the space set as the destination for the vehicle 10 at the previous timing matches the space selected at the current timing, as a variable. For example, when the space set as the destination for the vehicle 10 at the previous timing matches the space selected at the current timing, the space evaluating unit 232 sets the space information to be 50, or when it does not match, it sets the space information as 0.

When the vehicle identification information for a vehicle associated with the space set as the destination for the vehicle 10 at the previous timing, matches with vehicle identification information for a vehicle associated with the space selected at the current timing, the space evaluating unit 232 determines that the previous space and the current space match.

The evaluation function produces a high (or low) evaluation value for the same space as the space set as the destination at the previous timing. Since it is thus easier to set the same space as the destination, the driver feels more comfortable during the lane change.

(2) The parallel running time required for the vehicle 10 to travel from the current location to a location next to the space is a variable A7.

The parallel running information calculating unit 234 calculates the parallel running point time required for the vehicle 10 to travel on the traveling lane and run parallel to the space selected on the adjacent lane, based on the current location and speed of the vehicle 10, and the location and speed of the selected space. As shown in FIG. 6, the parallel running information calculating unit 234 selects a trajectory T1 in which the vehicle 10 does not contact with other vehicles, and calculates the parallel running point time.

The evaluation function produces a higher (or lower) evaluation value for spaces with a smaller variable A7. Since it is thus easier to determine the destination the shorter the moving time of the space, the driver feels more comfortable during the lane change.

(3) The starting distance required for the vehicle 10 to travel on the traveling lane up to the start location where it can physically and legally move from the traveling lane to the adjacent lane is a variable A8.

Based on the current location of the vehicle 10, object detection information, and the map information, the distance calculating unit 233 calculates the starting distance required for the vehicle 10 to move on the traveling lane to the start location where it is possible to physically and legally move from the traveling lane on which the vehicle 10 is traveling to the adjacent lane.

For example, in a zone where a pole is standing between the traveling lane and the adjacent lane, it is not physically possible for the vehicle 10 to move from the traveling lane to the adjacent lane. In a zone bearing a lane marking line prohibiting movement between the traveling lane and adjacent lane, it is not legally possible for the vehicle 10 to move from the traveling lane to the adjacent lane.

When it is possible to physically and legally move from the traveling lane to the adjacent lane at the current location of the vehicle 10, the distance calculating unit 233 defines the starting distance as zero.

The evaluation function produces a higher (or lower) evaluation value for spaces with a smaller variable A8. Since it is thus easier to determine the destination the shorter the starting distance of the space, the driver feels more comfortable during the lane change.

(4) The difference in speed between the speed of the vehicle 10 and the space speed is a variable A9.

The speed difference calculating unit 236 determines the difference in speed as the difference between the current speed of the vehicle 10 and the speed of the selected space.

The evaluation function produces a higher (or lower) evaluation value for spaces with a smaller variable A9. Since it is thus easier to determine the destination the smaller the difference in speed occurring during movement for the space, the driver feels more comfortable during the lane change.

(5) The difference in speed as the difference between the speed of another vehicle located ahead of or behind the space and the speed of the vehicle 10, on the adjacent lane, is a variable A10.

The speed difference calculating unit 236 calculates the difference in speed as the difference between the current speed of the vehicle 10 and the speed of another vehicle traveling on an adjacent lane.

The evaluation function produces a higher (or lower) evaluation value for spaces with a smaller variable A10. Since it is thus easier to determine the destination the smaller the change in speed occurring during movement for the space, the driver feels more comfortable during the lane change.

(6) The inter-vehicular distance between the current location of the vehicle 10 and the location of other vehicles located ahead of or behind the vehicle 10, on the traveling lane, is a variable A11.

The distance calculating unit 233 calculates the inter-vehicular distance between the current location of the vehicle 10 and the location of other vehicles located ahead of or behind the vehicle 10, on the traveling lane.

When the inter-vehicular distance with another vehicle located ahead of the vehicle 10 (variable A11) is short (small), for example, the evaluation function produces a lower (smaller) evaluation value for spaces which require acceleration to move. Since it is thus easier to determine the destination to be a space where the inter-vehicular distance with another vehicle located ahead of the vehicle 10 is not too close during movement, the driver feels more comfortable during the lane change.

When the inter-vehicular distance with another vehicle located behind the vehicle 10 (variable A11) is short (small), for example, the evaluation function produces a lower (smaller) evaluation value for spaces which require deceleration to move. Since it is thus easier to determine the destination to be a space where the inter-vehicular distance with another vehicle located behind the vehicle 10 is not too close during movement, the driver feels more comfortable during the lane change.

(7) The difference in speed as the difference between the speed of another vehicle located ahead of or behind the vehicle 10 and the speed of the vehicle 10, on the traveling lane, is a variable A12.

The speed difference calculating unit 236 calculates the difference in speed as the difference between the speed of another vehicle located ahead of or behind the vehicle 10 and the speed of the vehicle 10, on the traveling lane.

When the difference in speed with another vehicle located ahead of the vehicle 10 (variable A12) is small, for example, the evaluation function produces a lower (or higher) evaluation value for spaces which require acceleration to move. Since it is thus easier to determine the destination to be a space where the inter-vehicular distance with another vehicle located ahead of the vehicle 10 is not too close during movement, the driver feels more comfortable during the lane change.

When the difference in speed with another vehicle located behind the vehicle 10 (variable A12) is small, for example, the evaluation function produces a lower (or higher) evaluation value for spaces which require deceleration to move. Since it is thus easier to determine the destination to be a space where the inter-vehicular distance with another vehicle located behind the vehicle 10 is not too close during movement, the driver feels more comfortable during the lane change.

The evaluation value calculating unit 237 may calculate the space evaluation value based on all or some of the aforementioned variables A6 to A12. For example, when all of variable A6 to A12 have been added in formula (1), N=12.

According to the present disclosure, the lane change evaluating device, computer program for evaluation of lane change, medium for storing the computer program and method for evaluating lane change according to the embodiments described above may incorporate appropriate modifications that are still within the gist of the disclosure. Moreover, the technical scope of the disclosure is not limited to these embodiments, and includes the invention and its equivalents as laid out in the claims.

For example, the evaluation function in the embodiment described above was the sum of products of variables and weights, but the table function does not need to be a linear function. The evaluation function may also be a non-linear function.

The invention claimed is:

1. A travel lane planning device for a vehicle, the travel lane planning device comprising:
a communication interface configured to be connected to an in-vehicle network, the in-vehicle network connected to:
an object detector including:
a camera on the vehicle; and
a LiDAR sensor on the vehicle;
a map information storage device storing terrain restrictions for a plurality of travel lanes;
a vehicle control device that automatically controls a steering wheel actuator of the vehicle, an accelerator of the vehicle, and a brake of the vehicle; and
a processor programmed to:
receive, via the communication interface, location and speed information for each of a plurality of surrounding vehicles detected by the object detector and traveling in the travel direction of the vehicle;
based on the received location and speed information for each of the surrounding vehicles, define multiple spaces on a lane adjacent to a travel lane of the vehicle that are within a predetermined distance from a current location of the vehicle and which allow the vehicle to move from the travel lane to the adjacent lane, each of the multiple spaces being defined by:
defining a length of the space based on a distance between a one of the surrounding vehicles that is in front of the space in the traveling direction and a one of the surrounding vehicles that is behind the space in the traveling direction; and
defining a speed of the space based on the received speed information for the one of the surrounding vehicles that is in front of the space in the traveling direction and the received speed information for the one of the surrounding vehicles that is behind the space in the traveling direction;

access, via the communication interface, a terrain restriction for the travel lane from the map information storage device;

based on the accessed terrain restriction, set a movement completion location where movement to the adjacent lane is to be complete;

calculate a distance from the current location of the vehicle to the set movement completion location;

estimate for each defined space, an amount of acceleration or deceleration required for the vehicle to travel into the defined space;

calculate a positional relationship between the current location of the vehicle and each defined space based on:
the position of each surrounding vehicle relative to the defined space;
the position of the vehicle relative to the defined space;
the speed of each surrounding vehicle relative to the defined speed of the defined space; and
the speed of the vehicle relative to the defined speed of the defined space;

calculate for each defined space a speed difference between the defined speed of the defined space and a target travel speed of the vehicle;

calculate an evaluation value for each defined space based on:
the calculated distance from the current location of the vehicle to the movement completion location;
the defined length of the defined space;
the calculated positional relationship between the current location of the vehicle and the defined space,
the estimated amount of acceleration or deceleration required for the vehicle to travel into the defined space; and
a first speed difference between the defined speed of the defined space and a target speed which is the target for traveling of the vehicle;

compare the calculated evaluation values;

set a one of the defined spaces having the highest evaluation value a destination space; and instruct, via the communication interface, the vehicle control device to automatically guide the vehicle into the set destination space.

2. The travel lane planning device according to claim 1, wherein the processor is programmed to calculate the evaluation value for each defined space also based on a parallel running point distance in which the vehicle travels in the travel lane until the point where the vehicle runs parallel to the defined space on the adjacent lane.

3. The travel lane planning device according to claim 1, wherein the processor is programmed to:
set the destination space for each of a previous timing and a current timing, and
calculate the evaluation value for each defined space based on information representing whether or not the destination space set at the previous timing matches the defined space at the current timing.

4. The travel lane planning device according to claim 1, wherein the processor is programmed to calculate the evaluation value for each defined space based on a parallel running point time required for the vehicle to travel from the current location to a location next to the defined space.

5. The travel lane planning device according to claim 1, wherein the processor is programmed to calculate the evaluation value for each defined space based on a starting distance required to travel on the travel lane to a start location where movement of the vehicle from the travel lane to the adjacent lane is physically and legally possible.

6. The travel lane planning device according to claim 1, wherein the processor is programmed to calculate the evaluation value for each defined space based on a second speed difference which is a difference between the speed of the vehicle and the defined speed of the defined space.

7. The travel lane planning device according to claim 1, wherein the processor is programed to calculate the evaluation value for each defined space based on a third speed difference which is a difference between the speed of the vehicle and a speed of another vehicle located ahead of or behind the defined space, on the adjacent lane.

8. The travel lane planning device according to claim 1, wherein the processor is programmed to calculate the evaluation value for each defined space based on an inter-vehicular distance between a location of another vehicle located ahead or behind the vehicle, and the current location of the vehicle, on the travel lane.

9. The travel lane planning device according to claim 1, wherein the processor is programmed to calculate the evaluation value for each space based on a fourth speed difference which is a difference between the speed of the vehicle and a speed of another vehicle located ahead of or behind the vehicle, on the travel lane.

10. A computer-readable, non-transitory storage medium storing a computer program for traveling lane planning, wherein the computer program causes a processor to execute a process, the process comprising:
receiving, via a communication interface, location and speed information for each of a plurality of surrounding vehicles detected by an object detector and traveling in the travel direction of the vehicle, the communication interface configured to be connected to an in-vehicle network, the in-vehicle network connected to the object detector, which includes a camera on the vehicle and a LiDAR sensor on the vehicle;
based on the received location and speed information for each of the surrounding vehicles, defining multiple spaces on a lane adjacent to a travel lane of the vehicle that are within a predetermined distance from a current location of the vehicle and which allow the vehicle to move from the travel lane to the adjacent lane in which the vehicle is traveling, each of the multiple spaces being defined by:
defining a length of the space based on a distance between a one of the surrounding vehicles that is in front of the space in the traveling direction and a one of the surrounding vehicles that is behind the space in the traveling direction; and
defining a speed of the space based on the received speed information for the one of the surrounding vehicles that is in front of the space in the traveling direction and the received speed information for the one of the surrounding vehicles that is behind the space in the traveling direction;
accessing, via the communication interface, a terrain restriction for the travel lane from a map information storage device, the map information storage device storing terrain restrictions for a plurality of travel lanes;
based on the accessed terrain restriction, setting a movement completion location where movement to the adjacent lane is to be complete;
calculating a distance from the current location of the vehicle to the set movement completion location;
estimating for each defined space, an amount of acceleration or deceleration required for the vehicle to travel into the defined space;
calculating a positional relationship between the current location of the vehicle and each defined space based on:
the position of each surrounding vehicle relative to the defined space;
the position of the vehicle relative to the defined space;
the speed of each surrounding vehicle relative to the defined speed of the defined space; and
the speed of the vehicle relative to the defined speed of the defined space;
calculating for each defined space a speed difference between the defined speed of the defined space and a target travel speed of the vehicle;
calculating an evaluation value for each defined space based on:
the calculated distance from the current location of the vehicle to the movement completion location;
the defined length of defined space;
the calculated positional relationship between the current location of the vehicle and the defined space,
the estimated amount of acceleration or deceleration required for the vehicle to travel into the defined space; and
a first speed difference between the defined speed of the defined space and a target speed which is the target for traveling of the vehicle;
comparing the calculated evaluation values;
setting a one of the defined spaces having the highest evaluation value as a destination space; and
instructing, via the communication interface, a vehicle control device to automatically guide the vehicle into the set destination space, the vehicle control device configured to automatically control a steering wheel actuator of the vehicle, an accelerator of the vehicle, and a brake of the vehicle.

11. A traveling lane planning method carried out by a traveling lane planning device, the method comprising:
receiving, via a communication interface, location and speed information for each of a plurality of surrounding vehicles detected by an object detector and traveling in the travel direction of the vehicle, the communication interface configured to be connected to an in-vehicle network, the in-vehicle network connected to the object detector, which includes a camera on the vehicle and a LiDAR sensor on the vehicle;
based on the received location and speed information for each of the surrounding vehicles, defining multiple spaces on a lane adjacent to a travel lane of the vehicle that are within a predetermined distance from a current location of the vehicle and which allow the vehicle to move from the travel lane to the adjacent lane, each of the multiple spaces being defined by:
defining a length of the space based on a distance between a one of the surrounding vehicles that is in front of the space in the traveling direction and a one of the surrounding vehicles that is behind the space in the traveling direction; and
defining a speed of the space based on the received speed information for the one of the surrounding vehicles that is in front of the space in the traveling direction and the received speed information for the one of the surrounding vehicles that is behind the space in the traveling direction;
accessing, via the communication interface, a terrain restriction for the travel lane from a map information storage device, the map information storage device storing terrain restrictions for a plurality of travel lanes;
based on the accessed terrain restriction, setting a movement completion location where movement to the adjacent lane is to be complete;
calculating a distance from the current location of the vehicle to the set movement completion location;
estimating for each defined space, an amount of acceleration or deceleration required for the vehicle to travel into the defined space;
calculating a positional relationship between the current location of the vehicle and each defined space based on:
the position of each surrounding vehicle relative to the defined space;
the position of the vehicle relative to the defined space;
the speed of each surrounding vehicle relative to the defined speed of the defined space; and
the speed of the vehicle relative to the defined speed of the defined space;
calculating for each defined space a speed difference between the defined speed of the defined space and a target travel speed of the vehicle;
calculating an evaluation value for each defined space based on:
the calculated distance from the current location of the vehicle to the movement completion location;
the defined length of a length of the defined space;
the calculated positional relationship between the current location of the vehicle and the defined space,
the estimated amount of acceleration or deceleration required for the vehicle to travel into the defined space; and
a first speed difference between the defined speed of the defined space and a target speed which is the target for traveling of the vehicle;
comparing the calculated evaluation values;
setting a one of the defined spaces having the highest evaluation value as a destination space; and
instructing, via the communication interface, the vehicle control device to automatically guide the vehicle into the set destination space, a vehicle control device configured to automatically control a steering wheel actuator of the vehicle, an accelerator of the vehicle, and a brake of the vehicle.

* * * * *